April 7, 1931.  L. G. SIMJIAN  1,799,767
POSE REFLECTING SYSTEM FOR PHOTOGRAPHIC APPARATUS
Filed Nov. 7, 1929  4 Sheets-Sheet 1
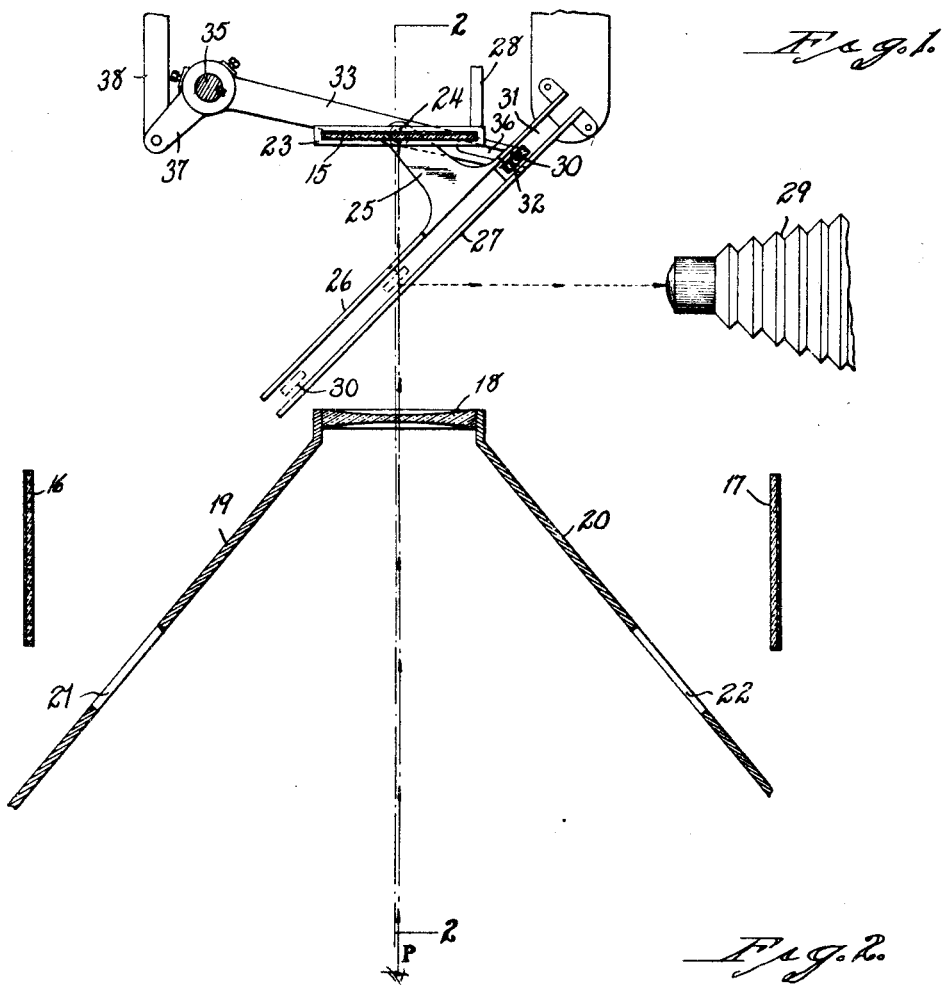
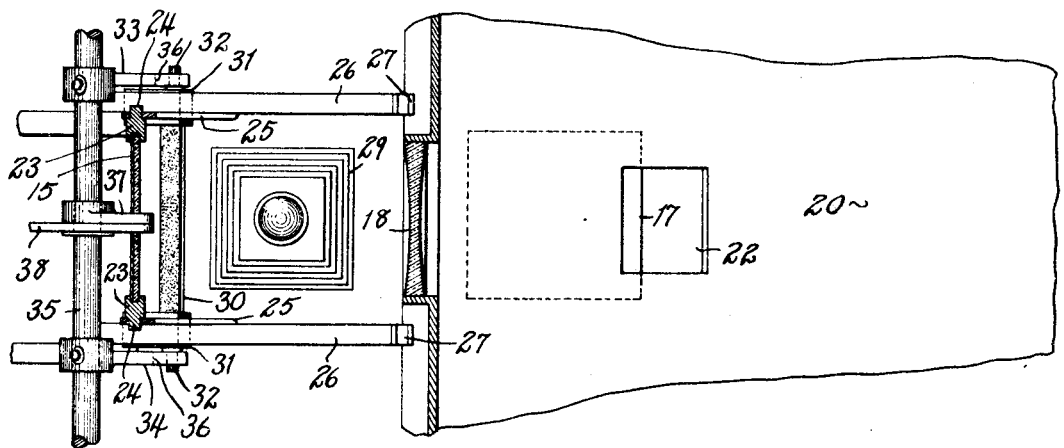

April 7, 1931. L. G. SIMJIAN 1,799,767
POSE REFLECTING SYSTEM FOR PHOTOGRAPHIC APPARATUS
Filed Nov. 7, 1929 4 Sheets-Sheet 2
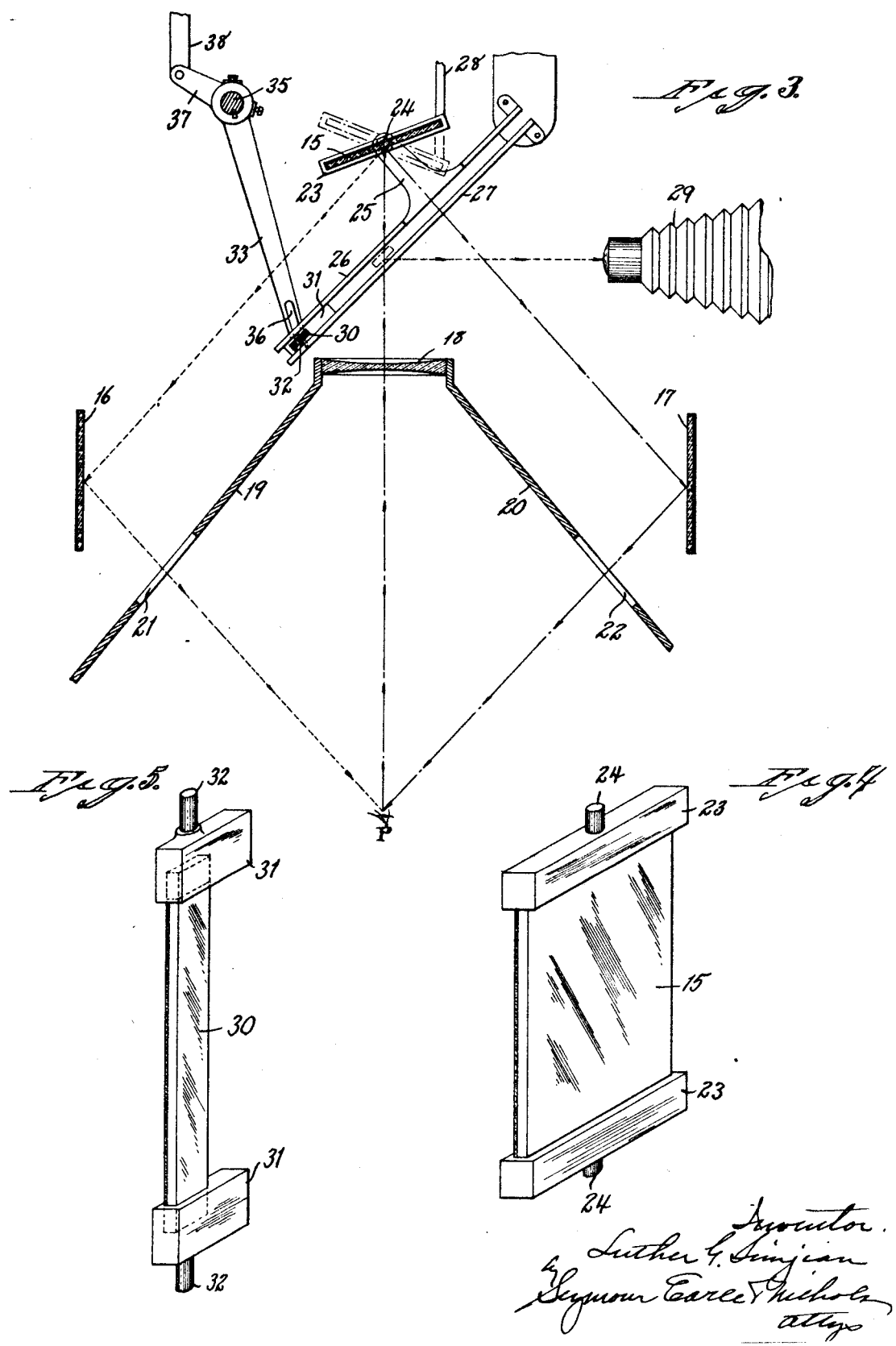

April 7, 1931. L. G. SIMJIAN 1,799,767
POSE REFLECTING SYSTEM FOR PHOTOGRAPHIC APPARATUS
Filed Nov. 7, 1929 4 Sheets-Sheet 4
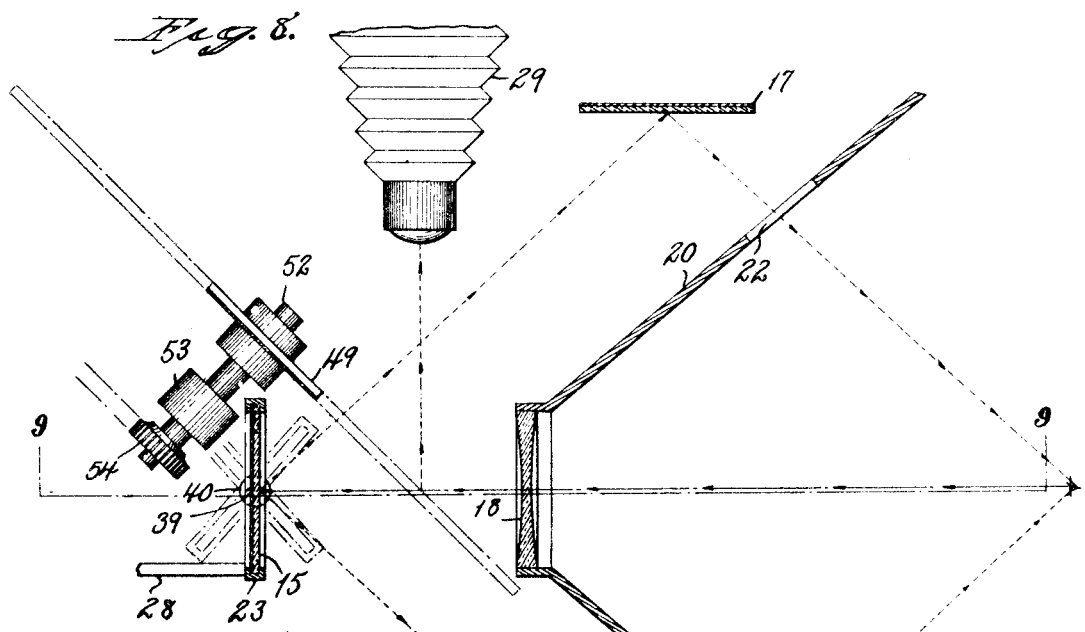
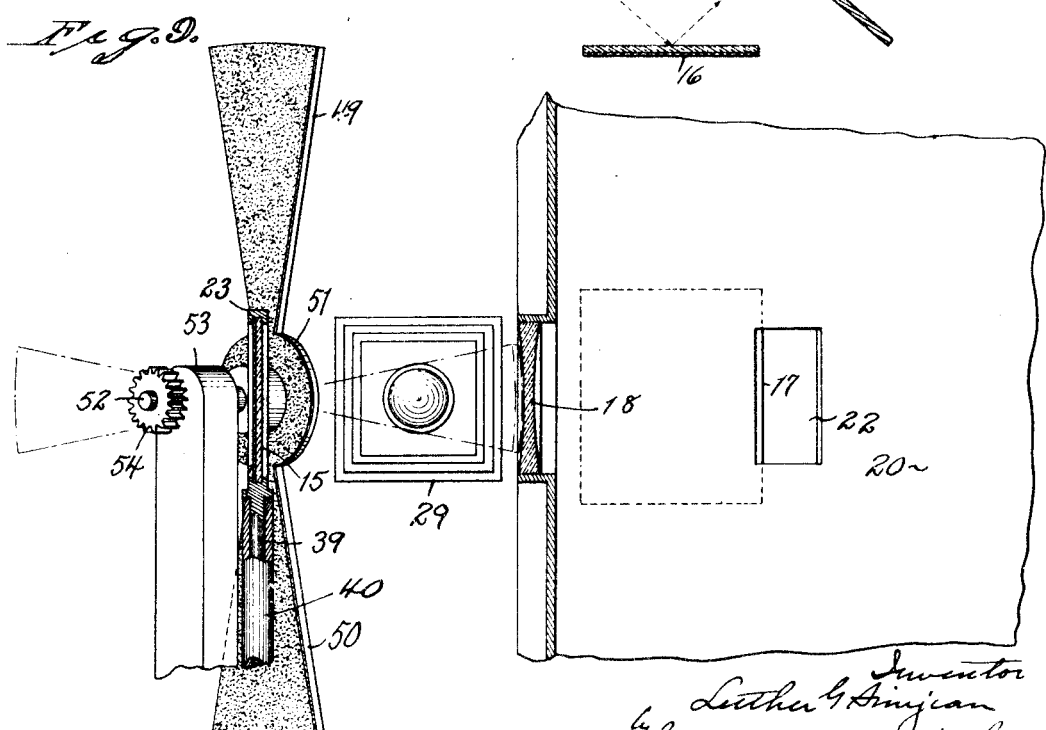

Patented Apr. 7, 1931

1,799,767

UNITED STATES PATENT OFFICE

LUTHER G. SIMJIAN, OF NEW HAVEN, CONNECTICUT

POSE-REFLECTING SYSTEM FOR PHOTOGRAPHIC APPARATUS

Application filed November 7, 1929. Serial No. 405,334.

This invention relates to an improvement in pose-reflecting systems for photographic apparatus and particularly to photographic apparatus designed for use in automatic or semi-automatic photographic machines, though not so limited.

The main object of this invention is to provide a simple and convenient pose-reflecting system for photographic apparatus which will enable a person being photographed to observe beforehand the image which the camera will record so that he may be guided in assuming a pose suitable to his tastes.

With the above and other objects in view my invention consists in a pose-reflecting system for photographic apparatus characterized by a camera, one or more pose-reflecting mirrors positioned so that a poser may observe a reflection therefrom of the image of himself which the camera will record, a movable image-deflecting mirror, and guide-means for the image-deflecting mirror constructed and arranged to guide the same into a position to deflect to the camera substantially the identical image being reflected to the poser at the time from the pose-reflecting mirror in question.

My invention further consists in a pose-reflecting system for photographic apparatus characterized as above and having certain other combinations and arrangements of parts as will be hereinafter described and particularly recited in the claims.

In the accompanying drawings:

Fig. 1 is a schematic view in horizontal section showing one form which my invention may assume;

Fig. 2 is a similar view partly in vertical section and partly in side elevation taken on the line 2—2 of Fig. 1;

Fig. 3 is a view corresponding to Fig. 1 but showing the central pose-reflecting mirror turned from its normal position to co-operate with the right-hand profile-reflecting mirror to enable the poser to observe a profile or semi-profile of himself;

Fig. 4 is a detached perspective view of the pivotal central pose-reflecting mirror;

Fig. 5 is a corresponding view of the image-deflecting mirror;

Fig. 8 is a schematic view in horizontal section showing still another form which my invention may assume; and Fig. 9 is a view thereof partly in vertical section and partly in side elevation taken on the line 9—9 of Fig. 8.

Figure 6:
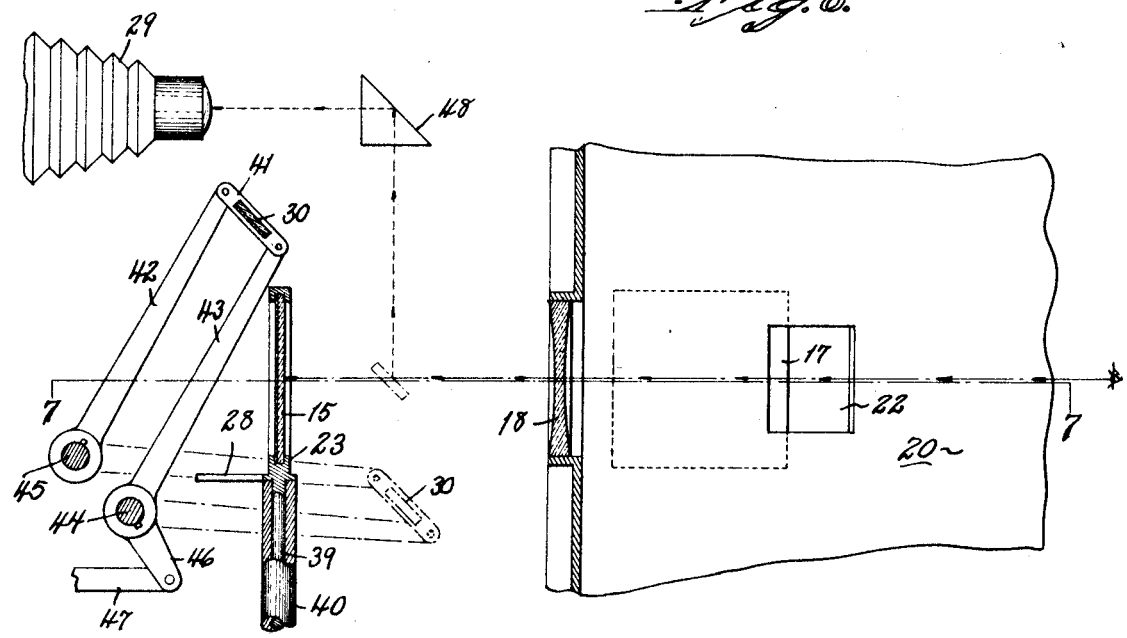
Fig. 6 is a schematic view partly in vertical section and partly in side elevation illustrating another form which my invention may assume.

In carrying out my invention herein shown, I employ a central pose-reflecting mirror 15 designed to enable the person whose portrait is being taken to observe a full-faced reflection of himself. Located forward of and on the respective opposite sides of the mirror 15 and in substantially the same horizontal plane are two side pose-reflecting mirrors 16 and 17 positioned to enable the poser to view a reflection of himself in profile or semi-profile, as will hereinafter appear.

Located directly in front of the central pose-reflecting mirror 15 is a reducing-lens 18 mounted at the junction of the diverging walls 19 and 20 of a shield designed to shield various parts of the mechanism from the view of the poser. The said diverging walls 19 and 20 are provided respectively with sight-openings 21 and 22 respectively arranged in line between the side pose-reflecting mirrors 16 and 17 and the normal position of a poser P.

The central pose-reflecting mirror 15 of the embodiment of my invention illustrated in Figs. 1 to 5 inclusive is provided at its respective upper and lower edges with a frame-bar 23, each of which is provided with a cylindrical trunnion 24. The trunnion 24 of the upper bar 23 bears in a horizontal arm 25 rearwardly offsetting from the inner one of an obliquely-arranged pair of complementary upper guide-plates 26 and 27. The downwardly-extending trunnion 24 of the bottom-bar 23 is similarly mounted in an arm 25 corresponding to the upper arm 25 and similarly offsetting from the inner one of a lower pair of complementary obliquely-arranged guide-plates 26 and 27.

It will be seen from the foregoing that the central pose-reflecting mirror is mounted with capacity for angular adjustment to the right or left, as indicated by full and broken lines respectively in Fig. 3 of the drawings, to reflect an image to the poser through the intermediary of either one of the side pose-reflecting mirrors 16 and 17 as will hereinafter appear. For the purpose of controlling the angular adjustment of the central pose-reflecting mirror 15 I pivot to the underface of the lower frame-bar 23 thereof, the forward end of an operating-link 28 extending into a convenient position for manual operation or for automatic operation if desired.

For the purpose of deflecting to the sensitized material in a camera 29 the image of the poser which he at the time is observing from any given one of the pose-reflecting mirrors, I provide a rectangular image-deflecting mirror 30 provided at its upper end with a guide-shoe 31 riding between the respective guide-bars 26 and 27 of the upper pair thereof and formed with a stud 32. The lower end of the image-deflecting mirror 30 is also provided with a guide-shoe 31 having a stud 32 and sliding between the respective guide-plates 26 and 27 of the lower pair thereof.

Normally the image-deflecting mirror 30 is located in a retired position to one side or the other of the axis of the reducing-lens 18, so as not to interrupt the light-path between the poser and the central pose-reflecting mirror 15 and is movable from such retired position to deflect the poser's image to the camera 29 by means of a complementary pair of upper and lower operating-arms 33 and 34 respectively secured to a vertically-arranged rock-shaft 35 and each bifurcated at its outer ends to form a coupling-notch 36. The coupling-notch 36 of the upper arm 33 receives the stud 32 of the upper guide-shoe 31 while the coupling-notch 36 of the lower arm 34 similarly receives the stud 32 of the lower guide-shoe 31.

To oscillate the rock-shaft 35 for the purpose of causing the image-deflecting mirror 30 to move into a position suitable to deflect the image of the poser to the camera 29 I secure to the said shaft between the arms 33 and 34 a short arm 37 to the outer end of which is pivotally connected an operating-link 38 extending to any suitable manual or automatic operating-mechanism not shown.

If the poser whose portrait is to be recorded by the camera 29 desires to view a full-face reflection of himself, he may do so by looking through the reducing-lens 18 at the central pose-reflecting mirror 15 which at this time is in a retired position, such as is shown in Figs. 1 and 2.

It may be explained at this point that the function of the reducing- or minus-lens 18 is to reduce the image reflected to the poser to such dimensions as to be readily "taken in" or observed at a glance.

When the poser has satisfied himself as to the desirability of the pose he has assumed by observing a reduced-scale reflection of the same in the central pose-reflecting mirror 15, the image-deflecting mirror 30 will be moved substantially the length of the guide-plates 26 and 27 so as to deflect the image, which the poser is at the time observing, into the camera 29 for recording thereby. It being understood that the shutter of the camera, if any is employed, is at this time in its open position.

It is intended that the image-deflecting mirror 30 be relatively narrow and that it be moved rapidly so that the poser is substantially unaware of its movement and will, therefore, not recoil or otherwise alter the pose with which he has previously satisfied himself. While the refinement of form and operation of the image-deflecting mirror just described is desirable, it is obvious that it is not essential to the successful operation of my improved photographic apparatus, since both the size and speed of movement of the said mirror may vary widely.

If the poser desires to view himself in profile or semi-profile, he may do so in either one of the side pose-reflecting mirrors 16 and 17 upon an appropriate adjustment of the central pose-reflecting mirror 15 as will now be explained.

Let it be supposed for purposes of description that the poser wishes to view himself in the right-hand pose-reflecting mirror 17. To permit this the central pose-reflecting mirror will be moved into the position in which it is shown by full lines in Fig. 3, whereby an image of the poser's profile or semi-profile will be reflected to him from the side mirror 17 which the latter has received in turn from the central mirror 15. When the poser is satisfied with the reflection which he is observing, the oblique movement of the image-deflecting mirror 30 will deflect the image to the camera 29 for recording thereby.

Similarly, the poser may observe his reflection in the left-hand pose-reflecting mirror 16 when the central mirror 15 is swung into the position in which it is indicated by broken lines in Fig. 3 and subsequently such a pose as the subject chooses may be recorded by the camera when the image-deflecting mirror is appropriately moved as above described.

Figure 7:
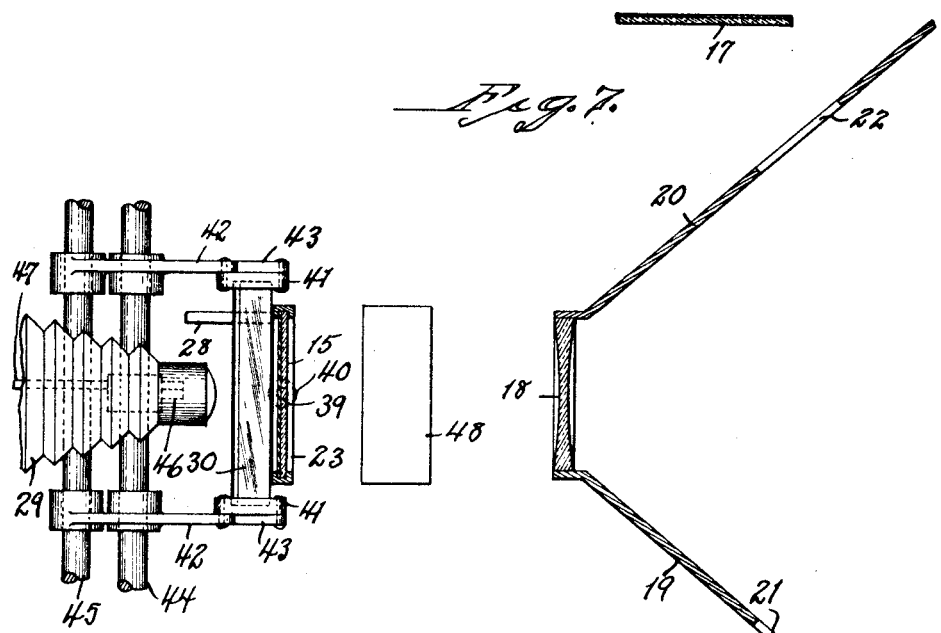
Fig. 7 is a view thereof partly in horizontal section and partly in plan taken on the line 7—7 of Fig. 6.

In the form of my invention illustrated in Figs. 6 and 7, the bottom-bar 23 of the central pose-reflecting mirror 15 is formed with a relatively-long trunnion 39 adapted to oscillate in a tubular support 40 so that the said mirror may be adjusted to co-operate with either the right-hand or left-hand pose-reflecting mirrors 16 or 17 as already described.

In this embodiment of my invention instead of guiding the image-deflecting mirror by means of guide-plates 26 and 27 and in a horizontal plane, I mount the said mirror for movement in a curved path in a vertical plane as shown, by providing it at each of its respective opposite ends with a head 41 to the respective opposite ends of each of which are pivotally connected a complementary pair of arms 42 and 43. It will be understood that both of the heads 41 are similarly connected to a pair of arms 42 and 43, as shown in Fig. 7 of the drawings.

The front arm 43 of each pair of arms is rigidly mounted upon a rock-shaft 44 and similarly the rear arm 42 of each pair of arms is mounted upon a rock-shaft 45 located above and to the rear of the rock-shaft 44. The two pairs of parallel arms just described serve to maintain the image-deflecting mirror 30 throughout its entire arcuate movement at a predetermined angle and in addition to serving as guide-means, these arms bodily carry the said mirror.

For the purpose of swinging the image-deflecting mirror 30, I provide the rock-shaft 44 with a depending arm 46 having pivotally secured to its lower end a link 47 extending to any suitable mechanism.

In the embodiment of my invention now being described (Figs. 6 and 7), I locate the camera 29 above the axis of the reducing-lens 18 and parallel therewith and provide a prism 48 to direct the image deflected from the image-deflecting mirror 30 when the same is moved, into the said camera as clearly shown by broken lines in Fig. 6.

The operation of the apparatus shown in Figs. 6 and 7 corresponds to that previously described in connection with Figs. 1 to 5 inclusive and requires no detailed description.

Coming now to the embodiment of my invention illustrated in Figs. 8 and 9 of the drawings, the central pose-reflecting mirror 15 is mounted in the same manner as that shown in Figs. 6 and 7 and the parts thereof bear corresponding numerals. In this instance, however, I employ a pair of complementary sector-shaped image-deflecting mirrors 49 and 50 rotatable in a plane obliquely disposed with reference to the poser's line of vision into the mirror 15. The sector-shaped mirrors just referred to extend radially at diametrically opposite points from a hub 51 mounted upon a short shaft 52 journaled in the upper end of a vertical support 53 and provided with a spur-gear 54 for connection with any suitable driving mechanism.

It will be seen that when either one of the image-deflecting mirrors 49 and 50 has imparted to it either a complete rotary movement or an oscillating movement into the position shown by dotted lines in Fig. 9, the image of the poser will be deflected to the camera 29 for recording thereby.

Many arrangements of parts other than those shown herein may be employed for carrying out my invention but it will be noted that each form is characterized by one or more pose-reflecting mirrors capable of reflecting an image to the poser and a movable image-deflecting mirror capable of deflecting substantially the identical image which the poser is observing to a camera for recording thereby.

Many materials may be employed for the various mirrors described and I wish it to be understood that by the use of the term "mirror" I include all material capable of performing the functions of a mirror.

I wish to have it understood also that while in a preferred embodiment of my invention I intend to mount one of the pose-reflecting mirrors for angular adjustment, that such capacity for adjustment is not essential to securing the basic results of my invention.

I claim:

1. In a pose-reflecting system for photographic apparatus, the combination with a camera; of a pose-reflecting mirror positioned so that a poser may observe a reflection therefrom of the image of himself which the said camera will record; a movable image-deflecting mirror; and guide-means for the said image-deflecting mirror arranged to guide the same into position to deflect to the sensitized material in said camera substantially the identical image being reflected to the poser at the time from the said pose-reflecting mirror.

2. A pose-reflecting system as defined in claim 1 and having the image-deflecting mirror mounted for bodily movement to deflect the image to the camera.

3. A pose-reflecting system as defined in claim 1 and having the image-deflecting mirror mounted for movement in a curved path.

4. In a pose-reflecting system for photographic apparatus, the combination with a camera; of a plurality of pose-reflecting mirrors positioned so that a poser may observe a reflection therefrom of the image of himself which the said camera will record; a movable image-deflecting mirror; and guide-means for the said image-deflecting mirror arranged to guide the same into position to deflect to the sensitized material in said camera substantially the identical image being reflected to the poser at the time from one of the said pose-reflecting mirrors.

5. In a pose-reflecting system for photographic apparatus, the combination with a camera; of a plurality of pose-reflecting mirrors positioned so that a poser may observe a reflection therefrom of the image of himself which the said camera will record, one of the said pose-reflecting mirrors being mounted for angular adjustment with respect to another to co-operate therewith in reflecting an image to the poser; a movable image deflecting mirror; and guide-means for the said image-deflecting mirror arranged to guide the same into position to deflect to the sensitized material in said camera substantially the identical image being reflected to the poser at the time from one of the said pose-reflecting mirrors.

6. In a pose-reflecting system for photographic apparatus, the combination with a camera; of a pair of pose-reflecting mirrors, one of which is positioned so that the poser may observe a reflection therefrom of the image of himself which the said camera will record and the other being mounted for angular adjustment to reflect an image to the poser through the intermediary of the first-mentioned pose-reflecting mirror; a movable image-deflecting mirror; and guide-means for the said image-deflecting mirror arranged to guide the same into position to deflect to the sensitized material in the said camera substantially the identical image being reflected to the poser at this time from the first-mentioned pose-reflecting mirror.

7. In a pose-reflecting system for photographic apparatus, the combination with a camera; of a central pose-reflecting mirror and a side pose-reflecting mirror, both positioned so that a poser may observe a reflection therefrom of the image of himself which the said camera will record, the said central pose-reflecting mirror being mounted for angular adjustment with respect to the said side pose-reflecting mirror to reflect an image to a poser through the intermediary of the said side pose-reflecting mirror; a movable image-deflecting mirror; guide-means for the said image-deflecting mirror arranged to guide the same into position to deflect to the sensitized material in the said camera substantially the identical image of himself which the poser is at the time observing in the said side pose-reflecting mirror.

8. In a pose-reflecting system for photographic apparatus, the combination with a camera; of a pair of pose-reflecting mirrors arranged substantially in the same horizontal plane and one of which is mounted for angular adjustment in a horizontal plane to reflect to the poser through the intermediary of the other of said mirrors substantially the identical image which will be recorded by the said camera; a movable image-deflecting mirror; and guide-means for the said image-deflecting mirror arranged to guide the same into position to deflect to the sensitized material in the said camera substantially the identical image at this time being observed by the poser.

9. In a pose-reflecting system for photographic apparatus, the combination with a camera; of a pair of pose-reflecting mirrors arranged substantially in the same horizontal plane and one of which is mounted for angular adjustment in a horizontal plane to reflect to the poser through the intermediary of the other of said mirrors substantially the identical image which will be recorded by the said camera; a movable image-deflecting mirror having capacity for movement in a curved path; and guide-means for the said image-deflecting mirror arranged to guide the same in a curved path into position to deflect to the sensitized material in the said camera substantially the identical image at this time being observed by the poser.

10. In a pose-reflecting system for photographic apparatus, the combination with a camera; of a pose-reflecting mirror positioned so that a poser may observe a reflection therefrom of the image of himself which the said camera will record; a long and narrow substantially-rectangular movable image-deflecting mirror; and guide-means for the said image-deflecting mirror arranged to guide the same into position to deflect to the sensitized material in said camera substantially the identical image being reflected to the poser at the time from the said pose-reflecting mirror.

11. In a pose-reflecting system for photographic apparatus, the combination with a camera; of a pose-reflecting mirror positioned so that a poser may observe a reflection therefrom of the image of himself which the said camera will record; a movable image-deflecting mirror appreciably smaller in one dimension than the corresponding dimension of the said pose-reflecting mirror; and guide-means for the said image-deflecting mirror arranged to guide the same into position to deflect to the sensitized material in said camera substantially the identical image being reflected to the poser at the time from the said pose-reflecting mirror; whereby the disturbing effects upon the poser of the movement of the said image-deflecting mirror is minimized.

12. In a pose-reflecting system for photographic apparatus, the combination with a camera; of a plurality of pose-reflecting mirrors positioned so that a poser may observe a reflection therefrom of the image of himself which the said camera will record; a movable image-deflecting mirror appreciably smaller in one dimension than the corresponding dimensions of the said pose-reflecting mirrors; and guide-means for the said image-deflecting mirror arranged to guide the same into position to deflect to the sensitized material in said camera substantially the identical image being reflected to the poser at the time from one of the said pose-reflecting mirrors; whereby the disturbing effects upon the poser of the movement of the said image-deflecting mirror is minimized.

13. In a pose-reflecting system for photographic apparatus, the combination with a camera and a pose-reflecting mirror disposed with reference to each other so that the photo-sensitive material in the said camera does not receive a reflection of a poser from the said pose-reflecting mirror; a movable image-deflecting mirror adapted to be interposed between a poser and the said pose-reflecting mirror and movable in a path obliquely disposed with respect to the sight-line of the poser to deflect the image of the said poser to the sensitized material in the said camera.

In testimony whereof, I have signed this specification.

LUTHER G. SIMJIAN.